(12) United States Patent
Skipper

(10) Patent No.: US 9,459,008 B2
(45) Date of Patent: Oct. 4, 2016

(54) METHOD OF CONTROLLING A FUEL SPLIT

(75) Inventor: Dorian Skipper, Lincoln (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 2212 days.

(21) Appl. No.: 12/523,135

(22) PCT Filed: Jan. 15, 2008

(86) PCT No.: PCT/EP2008/050367
§ 371 (c)(1),
(2), (4) Date: Jul. 14, 2009

(87) PCT Pub. No.: WO2008/087126
PCT Pub. Date: Jul. 24, 2008

(65) Prior Publication Data
US 2010/0050652 A1    Mar. 4, 2010

(30) Foreign Application Priority Data
Jan. 15, 2007  (EP) ..................... 07000715

(51) Int. Cl.
| F23N 1/00 | (2006.01) |
| F02C 9/28 | (2006.01) |
| F02C 9/34 | (2006.01) |
| F23N 5/24 | (2006.01) |

(Continued)

(52) U.S. Cl.
CPC . *F23N 1/00* (2013.01); *F02C 9/28* (2013.01); *F02C 9/34* (2013.01); *F23N 1/002* (2013.01); *F23N 5/24* (2013.01); *F23N 5/242* (2013.01); *F23R 3/286* (2013.01); *F23R 3/343* (2013.01); *F05D 2270/091* (2013.01); *F05D 2270/092* (2013.01); *F05D 2270/31* (2013.01); *F23D 2900/00015* (2013.01); *F23N 2031/06* (2013.01)

(58) Field of Classification Search
CPC .......... F23R 3/283; F23R 3/286; F23N 5/24; F23N 5/242; F23N 1/00; F23N 1/002; F02C 9/28; F02C 9/32; F02C 9/34
USPC ............ 60/740, 741, 746, 748, 737, 39.281, 60/790, 793; 431/12
See application file for complete search history.

(56) References Cited

U.S. PATENT DOCUMENTS 4,701,124 A * 10/1987 Maghon et al. .............. 431/284
5,311,742 A     5/1994 Itoh
5,680,753 A    10/1997 Hollinger (Continued)

FOREIGN PATENT DOCUMENTS

CN    1410712 A    4/2003
EP    1712837 A1   10/2006

(Continued)

OTHER PUBLICATIONS

Mike Stock, "Sound Solutions for NOx Reduction", Sermatech Power Solutions, Power Industry Development, Turbomachniery, p. 38, www.ecuinternational.com/pti.

*Primary Examiner* — Craig Kim

(57) ABSTRACT

A method of controlling a fuel split of a pilot fuel flow and a main fuel flow in a gas turbine combustor during a load reduction is provided. The rate of change of fuel flow demand is monitored and an additional pilot fuel flow is added. The amount of additional pilot fuel flow depends on the rate of the change in fuel flow demand.

7 Claims, 2 Drawing Sheets

(51) Int. Cl.
*F23R 3/28* (2006.01)
*F23R 3/34* (2006.01)

(56) References Cited

U.S. PATENT DOCUMENTS

| | | | |
|---|---|---|---|
| 5,806,299 A * | 9/1998 | Bauermeister et al. | 60/776 |
| 5,901,555 A * | 5/1999 | Mandai et al. | 60/747 |
| 6,722,132 B2 * | 4/2004 | Stuttaford et al. | 60/737 |
| 6,854,258 B2 * | 2/2005 | Moriya et al. | 60/39.465 |
| 2003/0061817 A1 | 4/2003 | Aoyama | |
| 2004/0144094 A1 * | 7/2004 | Moriya et al. | 60/737 |

FOREIGN PATENT DOCUMENTS

| | | |
|---|---|---|
| JP | 1139919 A | 6/1989 |
| RU | 2078971 C1 | 5/1997 |
| RU | 2079049 C1 | 5/1997 |
| RU | 2156405 C2 | 9/2000 |
| RU | 2168044 C2 | 5/2001 |
| SU | 1084544 A1 | 4/1984 |
| WO | WO 96/02796 A1 | 2/1996 |
| WO | WO 02/12795 A2 | 2/2002 |
| WO | WO 2006053866 A1 | 5/2006 |

\* cited by examiner

METHOD OF CONTROLLING A FUEL SPLIT

CROSS REFERENCE TO RELATED APPLICATIONS

This application is the US National Stage of International Application No. PCT/EP2008/050367, filed Jan. 15, 2008 and claims the benefit thereof. The International Application claims the benefits of European Patent Office application No. 07000715.8 EP filed Jan. 15, 2007, both of the applications are incorporated by reference herein in their entirety.

FIELD OF INVENTION

The invention relates to a method of controlling the fuel split, in particular in gas turbine combustors.

BACKGROUND OF INVENTION

A gas turbine substantially comprises a compressor, a combustor, a turbine and an exhaust channel. In the compressor air is compressed in preparation for the combustion process. Fuel is injected into the combustor where it is mixed with the compressed air from the compressor and burnt. The hot and pressurized gas from the combustor is then directed towards the turbine blades to drive the turbine. After passing through the turbine, the combustion gas exits through the exhaust channel.

Document WO 02/12795 A2 discloses a combustor which operates with two different fuel flows. One of these fuel flows is referred to as pilot fuel flow. This fuel flow is injected directly into the combustion chamber and is the only fuel flow during the starting of the engine. Once the engine has reached a certain percent of its operating speed, premix fuel flow (main fuel flow) is added to the combustion chamber in addition to the pilot fuel. This premix fuel flow is mixed with air prior to entering the combustion chamber hence the name "premix". By controlling the ratio of pilot flow to premix flow, the level of CO and $NO_x$ emissions can be adjusted. An example of a combustor with a pilot fuel flow and a premix fuel flow is disclosed in Sjunneson et al., International Publication No. WO 96/02796. The document WO 02/12795 A2 further discloses a control for adjusting the split between the premix and pilot fuel flows to control flame temperature and thus minimize emissions. A method of operating a combustor with two fuel flows is known. The operating method comprises the operating modes primary, lean-lean and premixed. Low $NO_x$ and CO emissions are only achieved in premix mode.

The pilot burner comprises injection and burning of pure fuel through primary nozzles, while the main burner comprises injection and burning of fuel premixed with air through secondary nozzles.

Rapid load reduction on certain gas turbine engines can result in flame failure due to pilot flow becoming too lean because of lags in the temperature measurements used to determine the required fuel split. For large load reductions, a minimum pilot split is triggered based on a step change in fuel demand, but this does not work on rapid ramped load changes where there is not a large enough step change in fuel flow.

SUMMARY OF INVENTION

The objective of the invention is to provide an advantageous method for controlling a fuel split in a gas turbine combustor, in particular in the case of rapid load changes.

This object is solved by a method of controlling a fuel split with the features of the claims. The depending claims describe further developments of the invention.

An inventive method of controlling a fuel split into a pilot fuel flow and a main fuel flow in a gas turbine combustor in case of load reductions comprises the monitoring of the rate of change of fuel demand. An additional pilot fuel flow is added depending on the rate of the change in fuel flow demand.

Increasing the pilot fuel split temporarily in this way while the total fuel flow is decreased rapidly reduces the chances of flame failure during rapidly ramped load reductions.

In an advantageous embodiment of the invention the additional pilot fuel flow is reduced to zero after load reduction so that the pilot fuel flow is not higher than necessary after the ramping down of the load. A too high pilot fuel flow could be detrimental to the emission characteristics of the gas turbine.

Further, a rate limit may be applied to the pilot fuel flow when the amount of additional pilot fuel flow is reduced to zero in order to prevent the pilot fuel flow from becoming too small after reducing the additional fuel flow to zero. A too small pilot fuel flow would negatively affect the flame stability.

In the inventive method, the additional pilot fuel flow can be added, e.g., when the change in fuel demand undershoots a give negative value. In a more sophisticated version of the method, the amount of the additional pilot fuel flow depends on the rate of change in the fuel flow demand, e.g. the more negative the rate of change in the fuel flow demand is the higher is the additional pilot fuel flow.

The amount of additional pilot fuel flow must be subtracted from the main fuel flow in order to keep the total fuel flow at the level defined by the fuel flow demand.

Further features, characteristics and advantages of the invention become clear from the following description of the embodiments in reference to the accompanying drawings.

DETAILED DESCRIPTION OF THE EMBODIMENT

Figure 1:
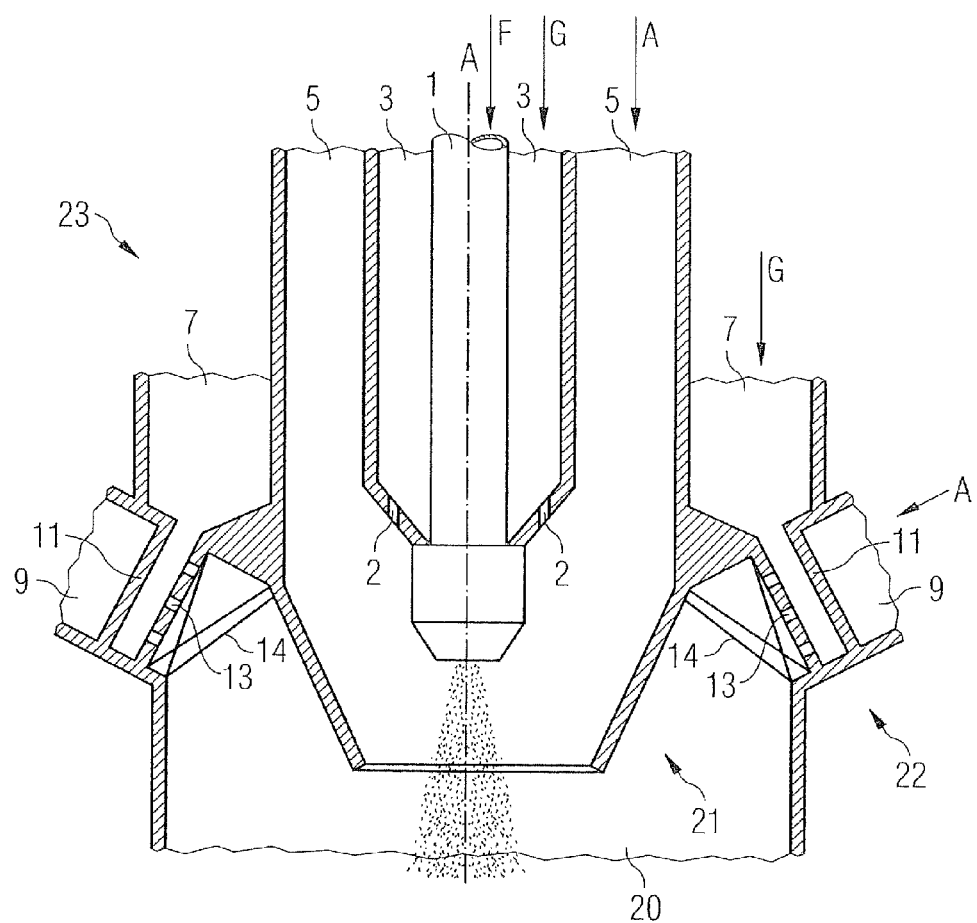
FIG. 1 shows a burner assembly of a gas turbine combustor.

FIG. 1 schematically shows a burner assembly 23 of a gas turbine combustor. The burner comprises a pilot burner 21 with a liquid fuel channel 1, a nozzle 2, a pilot gas channel 3 and a central air channel 5. The burner assembly 23 further comprises a main burner 22 with a main gas channel 7, an outer air channel 9, a nozzle tube 11 and nozzles 13.

The pilot burner 21 of FIG. 1 is symmetric with respect to a central axis A. It is implemented as a diffusion burner. The liquid fuel channel 1 is centrally located within the assembly. The liquid fuel channel 1 is surrounded by the pilot gas channel 3 which is concentric to the liquid fuel channel 1 and thus to the central axis A. The pilot gas channel 3 in turn is surrounded by a central air channel 5. Both channels 3 and 5 are concentric to the liquid fuel channel 1.

The main burner of FIG. 1, which is implemented as a premix burner, surrounds the pilot burner 21 and is substantially symmetric with respect to the central axis A. The main gas channel 7 of the main burner 22 is also concentric around the central axis A and meets nozzle tubes 11 extending through the outer air channel 9. In the nozzle tubes 11 nozzles 13 are provide for discharging the main fuel into the air stream flowing through the outer channel. Swirlers 14 cater for a thorough pre-mixing of fuel and air before the mixture is introduced into the combustion flame.

In operation of the gas turbine, the combustion is mainly fed through the main burner 22 while the pilot burner 21 serves to stabilize the combustion flame which could otherwise be prone to flame instabilities as one usually attempts to use a pre-mixed fuel/air mixture as lean as possible, i.e. with a fuel fraction as low as possible, in order to keep emissions low.

In the method of controlling a fuel split the rate of change of fuel demand is monitored and an extra amount of pilot fuel is added in case the fuel flow demand indicates a rapid load change to come, i.e. a load change in which a pre-given negative gradient in load, is reached or exceeded.

As the change in fuel demand precedes the load change, this monitoring allows for the early recognition that the load is to be reduced. Due to the early recognition, a change in fuel split can be initiated earlier than it would be possible with monitoring the combustion (or exhaust) temperature which tails after the load change.

The fuel supply in the pilot burner is relatively higher at ignition and low loads and relatively lower at high loads of the gas turbine. In other words, the distribution of the total amount of fuel to the pilot burner and the main burner, i.e. the fuel split, is different for low and high loads.

When the load is reduced, the fraction of the total amount of fuel which is to be delivered to the pilot burner is increased in relation to the fraction of the total amount of fuel which is to be delivered to the main burner. However, when a load reduction is performed quickly, as indicated by a high rate of change in the fuel flow demand, the fraction of the total amount of fuel which is to be delivered to the pilot burner needs to be increased quickly too.

As the fuel split is usually controlled on the basis of the combustion temperature which tails after the beginning of the a load reduction, the increase of pilot fuel begins after the load reduction has already started. While this is usually not a problem for slowly reducing loads, the pilot fuel fraction may already be too low when the pilot fuel change begins in case of rapid load changes. Therefore, according to the invention, an additional amount of fuel is led to the pilot burner when the load change begins, as indicated by the fuel flow demand, in order to ensure that always enough pilot fuel is introduced into the flame. Then, when the usual control based on the combustion temperature is capable of providing a high enough fraction of pilot fuel, the additional pilot fuel is reduced to zero again.

In the described embodiment, the amount of additional pilot fuel flow is higher the higher the rate of change in the fuel flow demand is. However, if the rate of change in the fuel flow demand is higher than a given negative value, i.e. the load reduction is slower than a pre-given rate, no additional pilot fuel flow is added to the conventionally controlled fuel split.

During operation of the main burner the pilot fuel flow should not exceed a certain value in order to keep emissions down. Therefore a threshold is applied to prevent the pilot fuel flow from getting higher than necessary for stabilizing the flame due to the added amount of pilot fuel. When the threshold is reached, the amount of added pilot fuel is reduced.

The additional pilot fuel is only required during the rapid load reduction process to avoid a low level of fuel in the pilot burner. Once the load has been reduced and a stable flame has been obtained by the regularly increased pilot fuel flow the amount of additional pilot fuel flow is reduced back to zero.

When the additional pilot fuel flow has been reduced to zero a rate limit is applied to prevent the pilot fuel flow from falling below the minimum level which is necessary for a stable combustion flame at low loads.

When adding the additional pilot fuel flow it is advantageous to reduce the main fuel flow accordingly in order to keep the total amount of the fuel flow, i.e. the sum of the pilot fuel and the main fuel flow unaffected by the additional pilot fuel.

Figure 2:
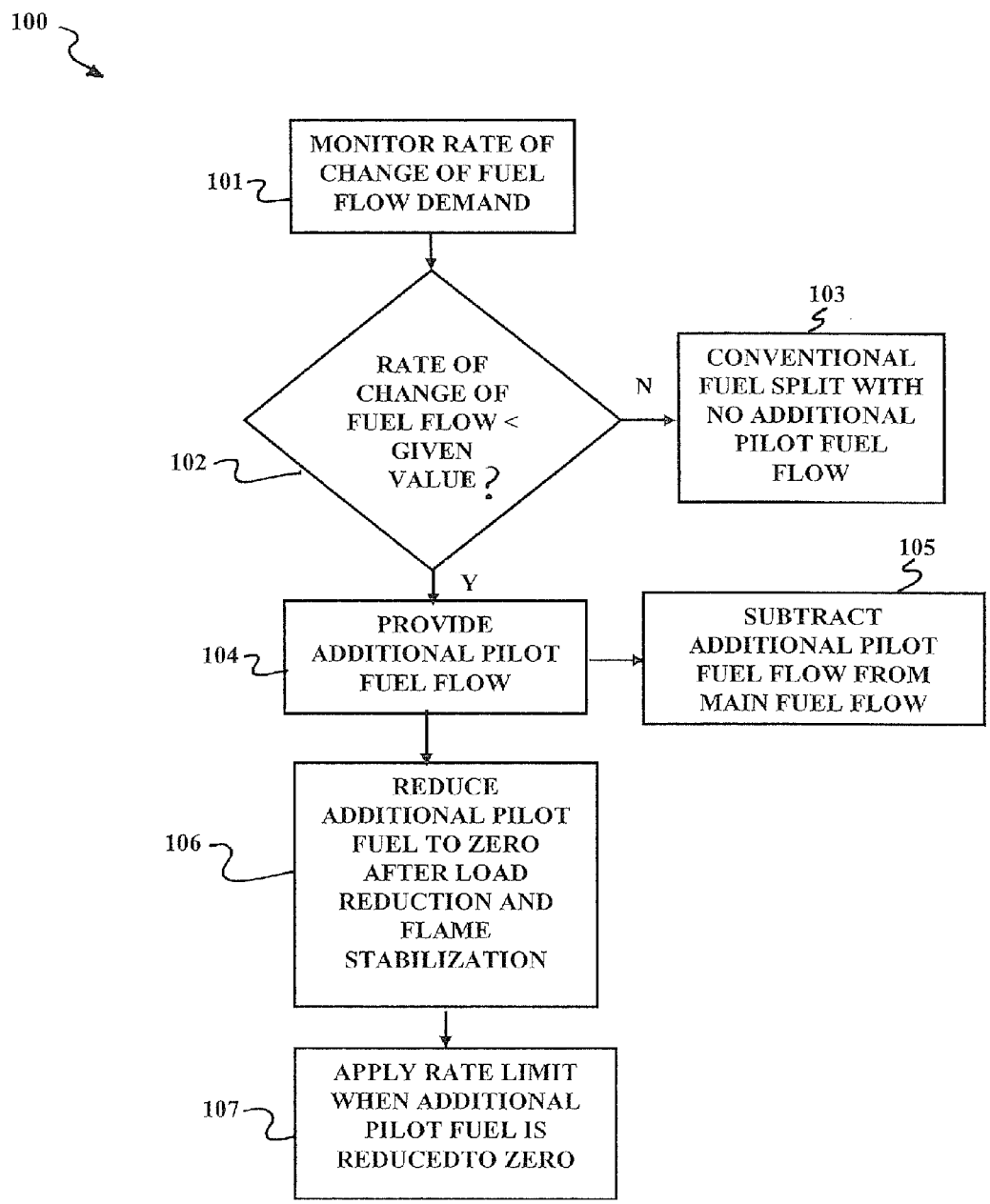
FIG. 2 is a flowchart illustrating an example method for controlling a fuel split.

FIG. 2 is a flowchart illustrating an example method 100 for controlling a fuel split. The method involves monitoring the rate of change of fuel flow demand (block 101). The additional pilot fuel flow to be supplied is dependent on the monitored rate of change of fuel demand. For load reduction, the rate of change is a negative value. In this embodiment, if the monitored rate of change is lesser than a given value (block 102) an additional pilot fuel flow is provided (block 104). However, if the rate of change in the fuel flow demand is higher than a given negative value, i.e. the load reduction is slower than a pre-given rate, no additional pilot fuel flow is added to the conventionally controlled fuel split (block 103). The amount of additional pilot fuel flow is subtracted from the main fuel flow (bock 105) in order to keep the total fuel flow at the level defined by the fuel flow demand. Once the load has been reduced and a stable flame has been obtained by the regularly increased pilot fuel flow the amount of additional pilot fuel flow is reduced back to zero (block 106). When the additional pilot fuel flow has been reduced to zero a rate limit is applied to prevent the pilot fuel flow from falling below the minimum level which is necessary for a stable combustion flame at low loads (block 107).

The invention claimed is:

1. A method of controlling a fuel split into a pilot fuel flow and a main fuel flow in a gas turbine combustor during a load reduction, the method comprising:
monitoring a rate of change of a fuel flow demand; and
adding an additional pilot fuel flow,
wherein an amount of the additional pilot fuel flow depends on the rate of change of the fuel flow demand.

2. The method of controlling a fuel split as claimed in claim 1, wherein the additional pilot fuel flow is reduced to zero after the load reduction.

3. The method of controlling a fuel split as claimed in claim 2, wherein a rate limit is applied to the pilot fuel flow when the amount of the additional pilot fuel flow is reduced to zero.

4. The method of controlling a fuel split as claimed in claim 1, wherein the additional pilot fuel flow is added when a rate of fuel flow demand is less than a given value.

5. The method of controlling a fuel split as claimed in claim 4, wherein the given value is a negative value.

6. The method of controlling a fuel split as claimed in claim 1, further comprising subtracting the additional pilot fuel from the main fuel flow in order to keep a total amount of fuel flow constant.

7. The method of controlling a fuel split as claimed in claim 1, wherein the load reduction is a rapid load reduction.

* * * * *